July 14, 1931.　　　J. WARDLE　　　1,813,976
TELEMOTOR OPERATED LIQUID DISCHARGE AND ADMISSION VALVE
Filed Nov. 23, 1928　　6 Sheets-Sheet 1
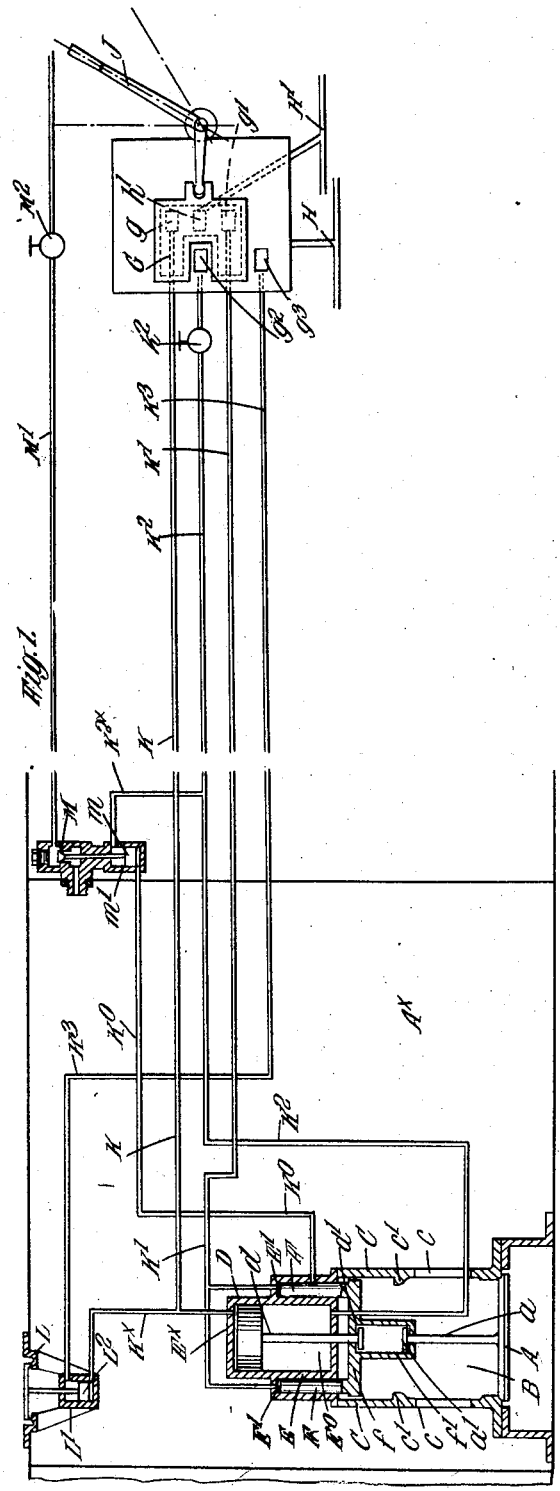
Inventor
John Wardle
By
Pennie Davis Marvin & Edmonds
attorneys July 14, 1931.   J. WARDLE   1,813,976
TELEMOTOR OPERATED LIQUID DISCHARGE AND ADMISSION VALVE
Filed Nov. 23, 1928   6 Sheets-Sheet 2
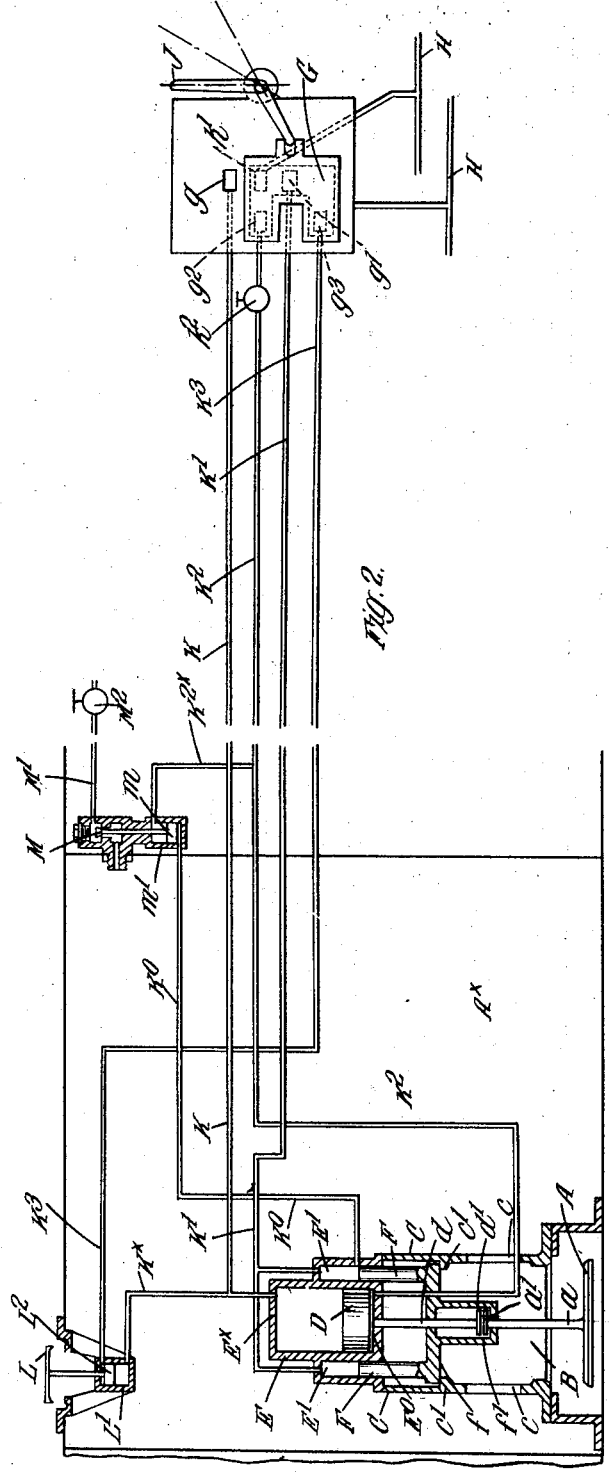
Inventor
John Wardle
By
Pennie Davis Marvin + Edmonds
attorneys

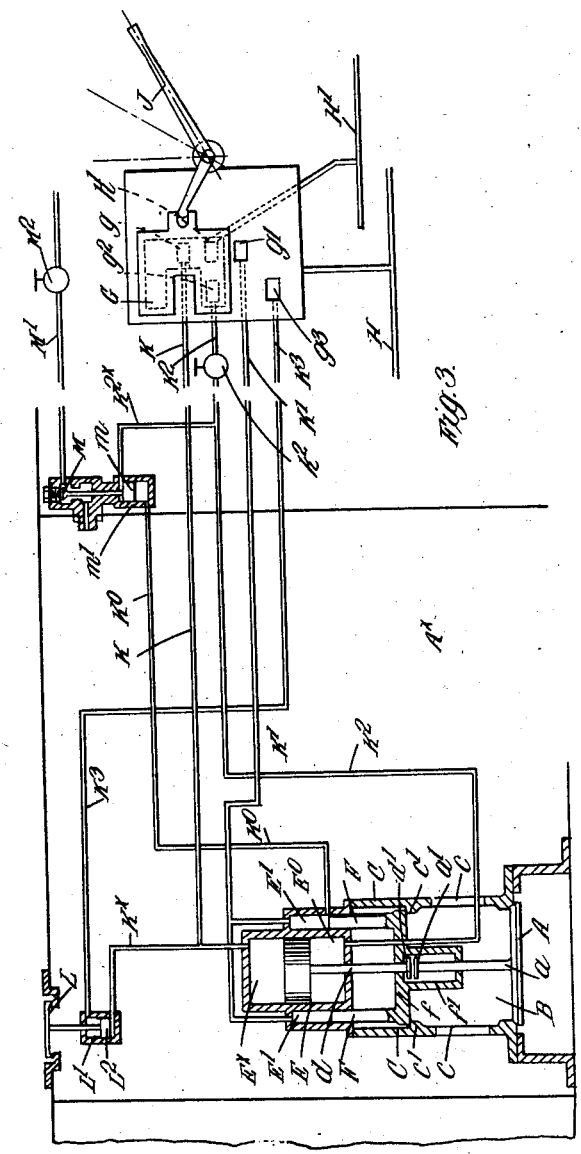

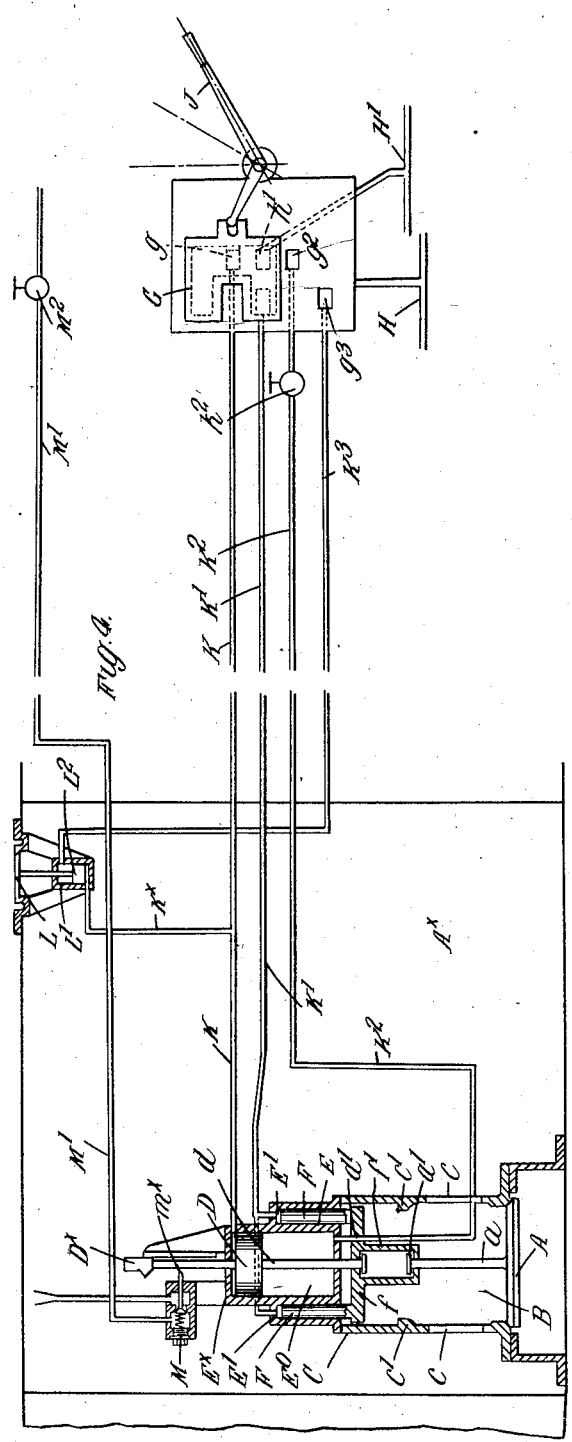

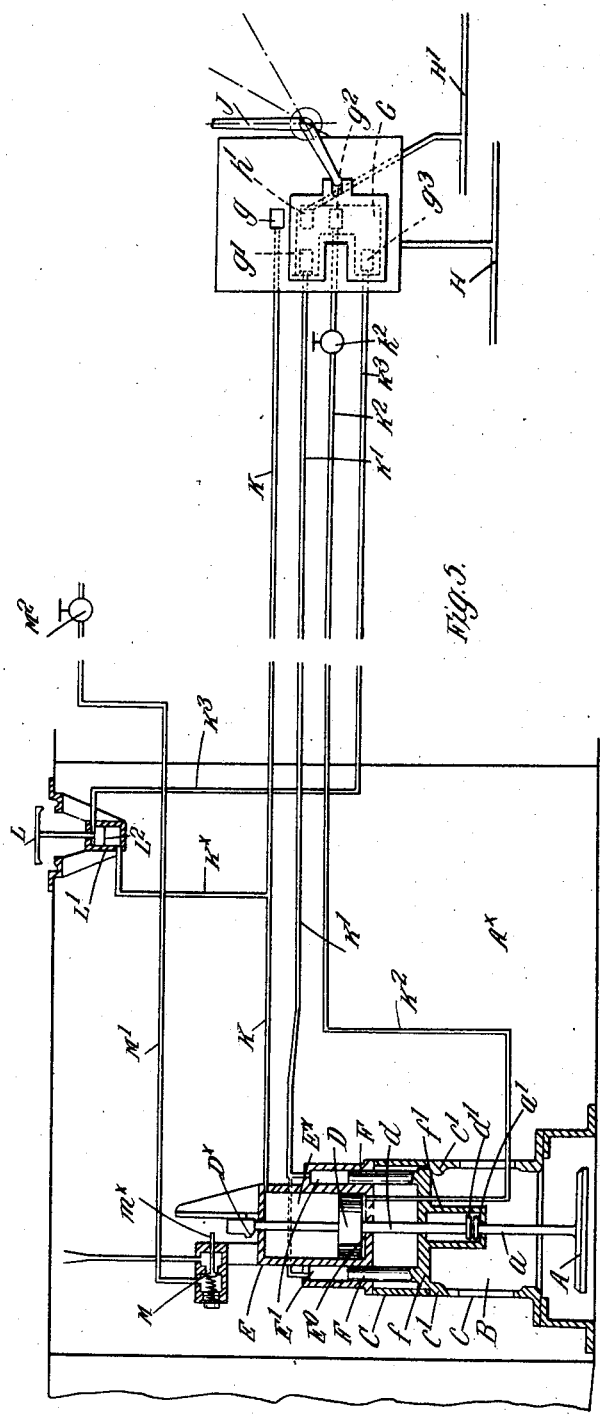

July 14, 1931. J. WARDLE 1,813,976
TELEMOTOR OPERATED LIQUID DISCHARGE AND ADMISSION VALVE
Filed Nov. 23, 1928 6 Sheets-Sheet 6
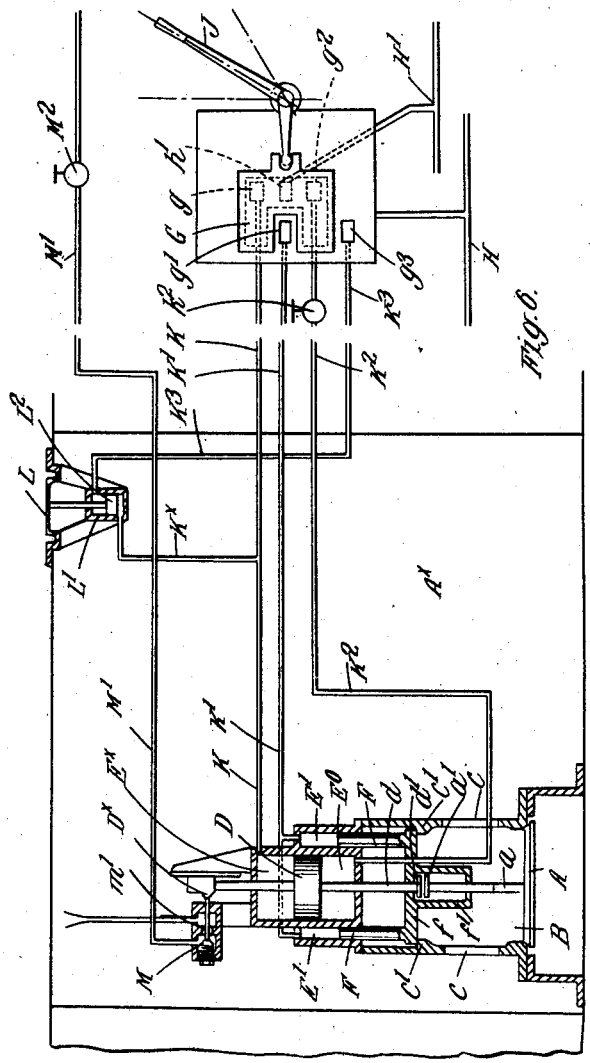
Inventor
John Wardle
By
Pennie Davis Marvin + Edmonds
attorneys Patented July 14, 1931

1,813,976

UNITED STATES PATENT OFFICE

JOHN WARDLE, OF VICKERSTOWN, BARROW-IN-FURNESS, ENGLAND, ASSIGNOR TO VICKERS-ARMSTRONGS LIMITED, WESTMINSTER, ENGLAND, A BRITISH COMPANY

TELEMOTOR OPERATED LIQUID DISCHARGE AND ADMISSION VALVE

Application filed November 23, 1928, Serial No. 321,447, and in Great Britain February 3, 1928.

This invention relates to telemotor operated valves of the type known as Kingston valves for controlling the admission of water to or its expulsion from tanks and other vessels, especially those used on submarines and ships where water has an occasion to be admitted (termed "flooding") during which operation a vent valve is opened to allow air to escape from the tank, or the water has to be expelled (termed "blowing") against the pressure of the external sea water by compresed air admitted by what is known as a blowing valve. The Kingston valve to which the present invention relates is one having three functional conditions viz., positively shut, positively open for flooding, and free to open for blowing when the internal air pressure exceeds the external sea pressure, these three conditions being determined by three positions of a control member which positions are hereinafter termed the "shut," "flood" and "blow" positions respectively.

According to the invention means are provided whereby in normal working the vent valve is opened only when the control member of the Kingston valve is in the "flood" position and also whereby the vent valve is closed when the said control member occupies the "shut" and "blow" positions. In this manner there is no possibility in normal working of the vent valve being open except during flooding or of its remaining open after flooding has taken place. Furthermore means are provided whereby the blowing valve is opened only when the control member of the Kingston valve is in the "blow" position and is closed when the said control member occupies the "shut" and "flood" positions. Thus a safeguard is provided against the blowing of the tank when the Kingston valve is shut or has been set for flooding. The whole arrangement is such that when a main stop cock or valve in the control room has been set to allow compressed air to have access to the blowing valve, the blowing or the flooding of the tank can be caried out by the operation of a single control member without any liability of error.

The vent valve may be provided with a piston working in a cylinder to the inner and outer ends of which pressure fluid can be admitted at the proper times by the control member of the Kingston valve, the end of the cylinder that is not in communication with the pressure main being placed in communication with the pressure main being placed in communication with the return main. The blowing valve may also have a piston working in a similar manner under the action of the said control member of the Kingston valve. Alternatively the blowing valve may be opened by a cam on a moving part appertaining to the Kingston valve so that the blowing valve is opened mechanically when the said part occupies the "blow" position.

The blowing valve is preferably arranged in or close to the tank with the result that a greater exactitude is possible in blowing desired quantities of water than is the case when the blowing valve is situated some distance from the tank, since the admission and shutting off of the compressed air is not subjected to the delay action caused by a length of pipe between the blowing valve and the tank.

In order that the said invention may be clearly understood and readily carried into effect, the same will now be described more fully with reference to the accompanying drawings in which:—

Figures 1, 2 and 3 are diagrams illustrating one form of our improvements with the parts in positions corresponding to the "shut", "flood" and "blow" positions respectively of the control member of the Kingston valve, and Figures 4, 5 and 6 are diagrams which correspond to Figures 1, 2 and 3 and show another form of our improvements.

In both the examples illustrated by the accompanying drawings the improvements are shown applied to the particular form of apparatus described in the specification of British Patent No. 291861 and the same reference letters are used for similar parts, that is to say A is the Kingston valve closing the opening B in the skin of the vessel and exposed to the seat on its outer face, C is a cylindrical support or bracket extending inwardly of the vessel or the tank and having openings $c$ which allow of free access of the water or air in the tank to the back of the Kingston valve, D is the valve operating piston disposed in a cylinder E (the inner or upper part $E^x$ of which is herein termed the "flood cylinder" and the outer or lower part $E^0$ is termed the "shut cylinder"), F, F are rams disposed in small cylinders $E^1$, $E^1$ on the sides of the cylinder E (these cylinders $E^1$, $E^1$ being herein termed the "blow cylinders"), $f$ is a cross member connecting the rams F, F together, $c^1$, $c^1$ are stops limiting the outward stroke of the said rams, $a^1$ and $d^1$ are heads or collars on the rods $a$, $d$ of the valve A and the piston D respectively, $f^1$ is a cylinder or guide in which these heads or collars slide, G is the distant controlling telemotor valve (herein termed the control valve) operated by a handle J and disposed in a casing having ports $g$, $g^1$ and $g^2$ communicating by means of pipes K, $K^1$ and $K^2$ with the flood cylinder $E^x$, the blow cylinders $E^1$, $E^1$ and the shut cylinder $E^0$ respectively, H is the pressure main communicating with the interior of the valve casing and $H^1$ is the return or exhaust main leading to a port $h^1$ in the valve casing. The operation of the parts mentioned above will be fully understood by reference to the specification and drawings of the aforesaid patent.

Referring now to the improvements forming the subject of the present invention, L is the vent valve which is opened to allow air to escape from the tank (which is indicated at $A^x$) when the latter is being flooded and M is the blowing valve which is opened to admit compressed air to the tank for expelling or "blowing" the water therefrom; this blowing valve M is arranged in or close to the tank $A^x$ and is placed at the end of a pipe $M^1$ provided with a main stop cock or valve $M^2$ arranged in the distant control room where the control valve G is situated. In both the examples shown the casing of this control valve G is formed with another port $g^3$ communicating with a pipe $K^3$ which leads to the upper or outer end of a cylinder $L^1$ containing a piston $L^2$ connected to the vent valve L, and the lower or inner end of this cylinder $L^1$ is placed in communication with a pipe $K^x$ leading to the pipe K which appertains to the "flood cylinder" $E^x$. The ports in the casing of the control valve G are so arranged in relation to this valve that the following operations take place:—When the valve is in the "shut" position shown in Figures 1 and 4 the pipes $K^2$ and $K^3$ are in communication with the pressure main H and the pipes K, $K^x$ and $K^1$ are in communication with the return main $H^1$, with the result that the Kingston valve is held closed by the action of the pressure fluid in the "shut" cylinder $E^0$ on the piston D and the vent valve L is held closed by the action of the pressure fluid in the upper or outer end of the cylinder $L^1$ on the piston $L^2$ of the said vent valve; when the control valve G is moved to the "flood" position shown by Figures 2 and 5 the pipes K and $K^x$ are in communication with the pressure main H and the pipes $K^1$, $K^2$ and $K^3$ are in communication with the return main $H^1$ with the result that the Kingston valve A is opened by the action of the pressure fluid in the "flood cylinder" $E^x$ on the piston D and the vent valve L is also opened by the action of the pressure fluid in the lower or inner end of the cylinder $L^1$ on the piston $L^2$ of the said vent valve; and when the control valve G is moved to the "blow" position shown by Figures 3 and 6 the pipes $K^1$ and $K^3$ are in communication with the pressure main H and the pipes K, $K^x$ and $K^2$ art in communication with the return main $H^1$ with the result that the cross member $f$ and the guide $f^1$ are moved downwards by the action of the pressure fluid in the "blow cylinders" $E^1$, $E^1$ on the rams F, F, (thereby leaving the Kingston valve A free to open when the internal pressure exceeds the external pressure) and the vent valve L is maintained shut by the action of the pressure fluid in the upper end of the cylinder $L^1$ on the piston $L^2$ of the said vent valve. In Figures 4 to 6 the relative position of the ports $g^1$ and $g^2$ is different from that of Figures 1 to 3 but the operation is the same.

From the above description it will be seen that the vent valve is opened only when the control valve G is in the "flood" position (Figures 2 and 5) and is closed when the said control valve is in the "shut" position (Figures 1 and 4) and the "blow" position (Figures 3 and 6).

The control valve G has been shown as being of the D or slide type but it could equally well be of the tubular piston type or of the rotary type.

In Figures 1 to 3 the aforesaid blowing valve M is provided with a piston $m$ working in a cylinder $m^1$ the upper end of which is placed in communication with the pipe $K^2$ by means of a pipe $K^{2x}$ and the lower end communicates with a pipe $K^0$ leading to the lower part of one of the "blow cylinders" $E^1$. In this manner when the control valve G occupies the "shut" position (Figure 1) and the pipe $K^2$ is in communication with the pressure main H the blowing valve M is maintained in the closed position by the action of the pressure fluid in the upper part of the cylinder $m^1$ on the piston $m$, whilst when the control valve G occupies the "flood" position (Figure 2) the blowing valve M is maintained closed by the action of the compressed air in the pipe $M^1$ on the head of this valve, and it is only when the control valve G occupies the "blow" position (Figure 3) and the rams F, F have reached their lowermost positions (in which one of them uncovers the end of the pipe $K^0$) that pressure fluid from the pipe $K^1$ reaches the lower end of the cylinder $m^1$ through the pipe $K^0$ and acts on the piston $m$ to raise the blowing valve M against the pressure of the compressed air on the head thereof; the blowing valve then admits compressed air to the tank $A^x$ to discharge the water therefrom past the Kingston valve A when the latter is opened as a result of the internal pressure in the said tank exceeding the external sea pressure. Alternatively the proportions of the parts of the blowing valve and the air pressure load on it can be so arranged that when the control valve G is placed into the "blow" position the movement of the rams F, F to place the Kingston valve A in the "blow" condition takes a place before the blowing valve is opened, the pressure fluid in this case being supplied direct to the inner end of the blowing valve cylinder $m^1$ by connecting the pipe $K^0$ to the pipe $K^1$ instead of to one of the "blow cylinders" $E^1$.

Figures 4 to 6 show a modified arrangement for operating the blowing valve M. In this arrangement the said valve is spring controlled and has a projecting stem $m^x$ with which a cam $D^x$ moving with the aforesaid piston D is adapted to co-operate. This cam is so arranged that when the piston D occupies the position shown by Figure 6 (into which it has been displaced by the movement of the aforesaid rams F, F into the "blow" position) it holds the valve M open. When the cam $D^x$ moves away from the stem $m^x$ on the return of the piston D to the "shut" position (Figure 4) the spring of the valve M closes the latter. The said cam is formed with two operating faces as shown the upper one being for the purpose of pressing back the valve M on the return movement of the piston D from the "flood" position (Figure 5) to the "shut" position (Figure 4).

From the above description it will be seen that in both the constructions shown the arrangements are such that when the main stop cock or valve $M^2$ in the control room has been set to allow compressed air to have access to the blowing valve M, the "blowing" or the "flooding" of the tank $A^x$ can be carried out by the operation of a single control member G without any liability of error. The vent valve L has the usual cotter (not shown) for securing it in the shut position when required and if this cotter is left in its securing position the Kingston valve A can be put to the "flood" position without opening the vent valve. If it is desired to open the vent valve without opening the Kingston valve a normally open stop cock $k^2$, in the pipe $K^2$ leading to the "shut" cylinder $E^0$, is moved to the closed position so as to trap the fluid in the said cylinder and thereby prevent the piston D from moving downwards. Under these conditions the control valve G can be moved to the "flood" position (Figures 2 and 5) to open the vent valve but without moving the piston D downwards to open the Kingston valve.

What I claim and desire to secure by Letters Patent of the United States is:—

1. In a tank having a telemotor operated Kingston valve of the type having three functional conditions, namely, positively shut, positively open for flooding, and free to open for blowing when the internal air pressure exceeds the external water pressure, a vent-valve having a piston thereon, and means connected with the piston and with the control valve of the telemotor for applying pressure to one end of said piston to thereby open the valve when the control valve is in the "flood" position, and means connected with the piston and with the control valve for applying pressure to the other end of said piston to close the valve when the control member is in the shut or in the blow position.

2. In a tank having a telemotor operated Kingston valve of the type having three functional conditions, namely, positively shut, positively open for flooding, and free to open for blowing when the internal air pressure exceeds the external water pressure, a vent-valve having a piston thereon, a piston cylinder therefor, a fluid pressure main and a fluid return main connected to the control valve of the telemotor, respective connections to the upper and lower ends of said piston cylinder from the said telemotor, control means in the telemotor for connecting the telemotor to the respective ends of said cylinder for fluid flow, and connections between the return main and the respective end of the cylinder out of communication at the time with the pressure main.

3. In a tank having a telemotor operated Kingston valve of the type having three functional conditions, namely, positively shut, positively open for flooding, and free to open for blowing when the internal air pressure exceeds the external water pressure, a blow-valve, a piston member thereon, and means connected to the piston and with the telemotor for applying pressure to one end of said piston to open the blow valve when the control member of the telemotor is in the "blow" position, and means connected to the piston and with the telemotor for applying pressure to the other end of said piston to close the valve when the control member is out of the "blow" position.

4. In a tank having a telemotor operated Kingston valve of the type having three functional conditions, namely, positively shut, positively open for flooding, and free to open for blowing when the internal air pressure exceeds the external water pressure, a blow-valve having a piston thereon, a piston cylinder therefor, a fluid pressure main and a fluid return main connected to the valve box of the telemotor, respective connections to the upper and lower ends of said cylinder from the said valve box, control means in the telemotor for supplying fluid under pressure to the respective connections of said cylinder, and connections between the return main and the cylinder end which is disconnected at the time with the pressure main.

5. In a tank having a telemotor operated Kingston valve of the type having three functional conditions, namely, positively shut, positively open for flooding, and free to open when the internal air pressure exceeds the external water pressure, said tank also having a blow-valve, a piston member on said Kingston valve a cylinder therefor, another cylinder surrounding said first cylinder, a ram in said second cylinder connected to said piston for reciprocation, said second cylinder having connections to a fluid under pressure, and having another port therein, and a connection between said port and said blow-valve whereby the blow-valve is adapted to be opened by the fluid admitted to said port by the proper movement of said ram.

6. In a tank having a telemotor operated Kingston valve of the type having three functional conditions, namely, positively shut, positively open for flooding, and free to open when the internal air pressure exceeds the external water pressure, said tank also having a blow-valve, a piston member on said Kingston valve, a cylinder therefor, another cylinder surrounding said first cylinder, an inlet connection between said second cylinder and the telemotor, a ram mounted in said second cylinder and connected to said piston for vertical reciprocation therewith, said second cylinder having another port therein, and a connection between said port and said blow-valve whereby the blow-valve is opened by the fluid admitted to the second cylinder to operate the ram.

7. In a tank having a telemotor operated Kingston valve and a blow-valve, a piston on the Kingston valve, a member extending from one end of said piston into juxtaposition with the blow-valve, and a cam surface on said extension for opening said blow-valve automatically upon the piston reaching the "blow" position.

8. In a tank having a telemotor operated Kingston valve of the type having three functional conditions, namely, positively shut, positively open for flooding, and free to open for blowing when the internal air pressure exceeds the external water pressure, in combination a telemotor valve box, a vent-valve having an operating piston, fluid connections between said telemotor valve and said piston for operating the vent-valve when the telemotor valve is in the "flood" position only, and a blow-valve having an operating piston connected to the telemotor valve for operating said blow-valve by fluid pressure when the telemotor valve is in the "blow" position only.

9. In a tank having a telemotor operated Kingston valve of the type having three functional conditions, namely, positively shut, positively open for flooding and free to open when the internal air pressure exceeds the external water pressure, the combination therewith of a blow-valve having an air inlet and an air outlet port, the air inlet port being connected with a source of air under pressure, and the outlet port opening directly into the tank whereby the rate of discharge of air into the tank is made independent of the distance of the source of the compressed air from the tank.

JOHN WARDLE.